United States Patent Office 3,517,111
Patented June 23, 1970

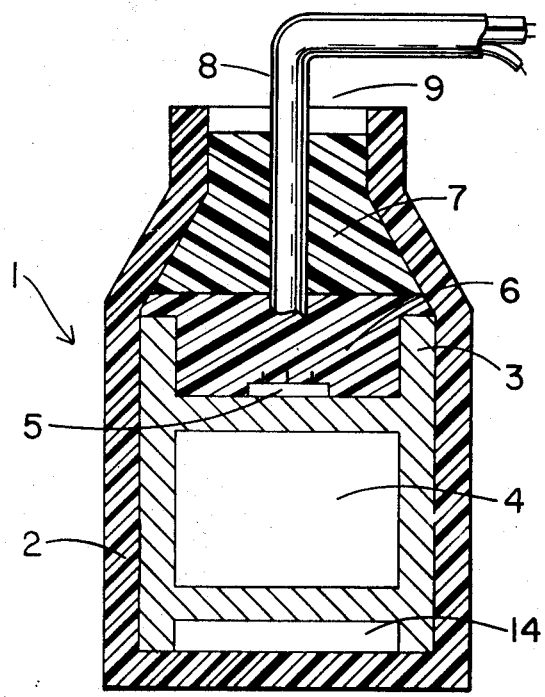
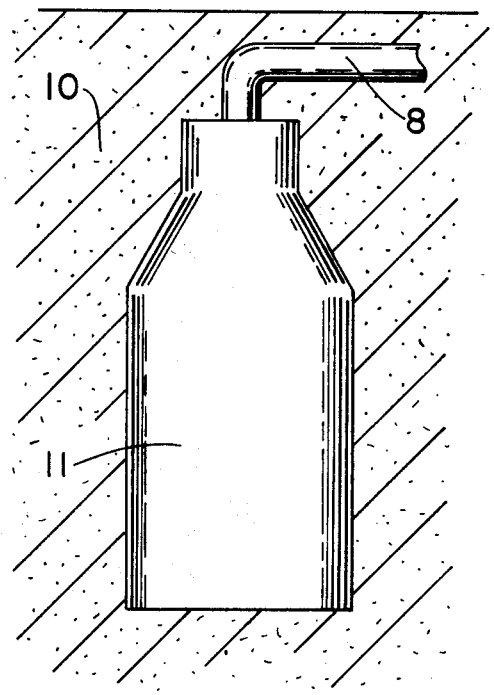
FIG. 1  FIG. 2
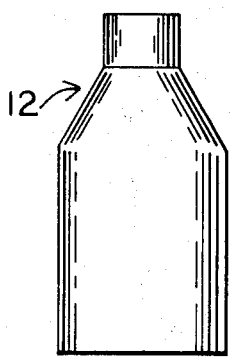
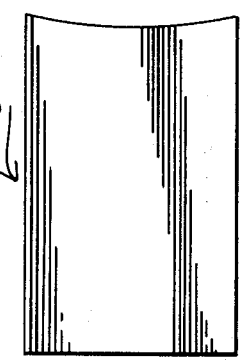
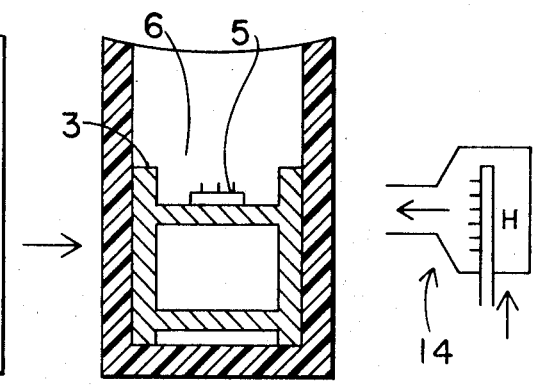
FIG. 3a  FIG. 3b  FIG. 3c
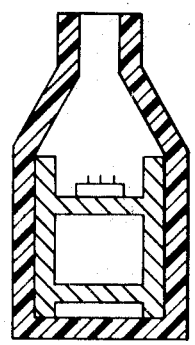
FIG. 3d
INVENTOR
WILLIAM F. JOHNSON
STRAUCH, NOLAN, NEALE, NIES & KURZ
ATTORNEY

3,517,111
**ENCAPSULATED ELECTRONIC COMPONENTS
AND METHOD OF MAKING SAME**
William F. Johnson, Hickory, N.C., assignor to Superior
Continental Corporation, Hickory, N.C., a corporation
of Delaware
Filed Mar. 12, 1968, Ser. No. 712,473
Int. Cl. H05k 5/06
U.S. Cl. 174—52                                             23 Claims

ABSTRACT OF THE DISCLOSURE

Disclosed herein is a container used for housing electronic components and a method of making same, the container being used in service either buried in the ground or exposed to the atmosphere. Basically, this housing is a plastic covered metal container having on the inside thereof an electronic circuit, the electronic circuit being in electrical connection with a terminal connector, which is affixed to an outside surface of the metal container. A plastic (crosslinked) case or sheath having an open top and a volume that is greater than the metal container, surrounds the metal container. A junction is formed by connecting an electrical conductor with the terminal connector and this junction is surrounded by a polyolifinic grease-like material. Disposed on top of this grease is a polyurethane foam material that at least partially fills that volume of the plastic container not occupied by the metal container, electrical conductor, grease, and terminal connector.

INTRODUCTION

This invention relates to cases or containers for housing electrical apparatus that are to be either buried in the ground or suspended on poles. When electrical cables or conductors are laid underground, it is the usual practice to provide special conduits therefor, and when auxiliary apparatus is buried along with such connectors or cables, special underground pits are provided in which the said auxiliary apparatus is installed.

To expedite the installation of transmission lines and to keep the cost thereof to a minimum, electrical cable conductors are sometimes laid directly in the soil. Cases for housing certain apparatus required in such transmission lines are also installed in the soil. In some sections of the country, these underground installations are subject to attack by rodents, particularly gophers. Where the soil is of an acid nature, electrolysis or corrosion soon destroys the underground cases. Frequent replacement of such apparatus cases is required, this replacement tending to offset the economical gain of placing the lines and apparatus in the soil. Thus, it is the purpose of this invention to protest underground apparatus cases from attack of rodents, destruction due to electrolysis and corrosion due to water and waper vapor. Such protection is achieved by the instant invention by the use of a metal container enclosed in a plastic case or sheath. This plastic sheath or container has an open top, is crosslinked, and contains a particulate filler material. The open top plastic container is heat shrunk around a metallic container and that volume of the plastic container not occupied by the metal container is filled with other plastic material.

This invention will be better understood from the following description together with the attached drawings.

FIG. 1 is a cut away cross section of an apparatus case showing the case in electrical connection with an electrical conductor.

FIG. 2 is a cross section of the soil showing implanted in the soil the apparatus case in combination with an elongated electrical conductor.

FIGS. 3a, 3b, 3c, and 3d, show in schematic sequential steps a method of making the apparatus case as shown in FIG. 1.

DETAILED DESCRIPTION OF THE INVENTION

Turning to FIG. 1, there is shown in general element 1 the apparatus case. A heat shrunk plastic material containing particulate filler is shown at 2, this plastic material being not only heat shrunk but is crosslinked also. Disposed on the inside of plastic container 2 is a further metal container shown at 3 that has a first cavity shown at 4, which is completely enclosed. There is also another cavity shown at 6, which has an opening formed by the terminal portion of the side wall shown at 3. Disposed in this second cavity is a terminal connector means shown at 5. Cable 8 is a conduit encasing a plurality of insulated electrical conductors, the metal portion of said electrical conductors being connected mechanically and electrically to terminal post 5. It will be immediately obvious from viewing FIG. 1 that container 3, which is made preferably of metal, has at least one side wall. This side wall, along with at least one closure means, forms the cavity 4 as well as the cavity 6. Cavity 4 is essentially a completely closed cavity, whereas cavity 6, as previously mentioned, is an open-top cavity. The volume occupied by metal container 3 is less than that volume circumscribed by plastic container 2. It is in this volume not occupied by metal container 3, terminal post 5, and cable 8, that a first plastic mass is disposed around the electrical and mechanical connection between terminal post 5 and electrical conductor 8. This plastic mass is shown at 6 and is preferably an amorphous grease-like polyethylene having an average molecular weight below about 10,000 and a density at 25° C. of about 0.851 gram/milliliter. Disposed on top of this polyethylene grease-like material is a second plastic material 7. Such plastic material is a polyurethane and is preferably a foam polyurethane containing particulate materials such as carbon black and channel black. This is the same carbon or channel black that can be combined with the crosslink plastic shown at 2. It should be noted that plastic container 2 has an open mouth configuration shown at 9, and the polyurethane material 7 preferably does not completely fill platsic container 2 flush with the terminal portions of the open mouth.

Even though it is possible to completely fill the open mouth portion 9 of the polyethylene container 2 with polyurethane foam 7 flush with the open mouth terminal portions (not shown in the drawings) it is preferable not to do so. A partially filled construction is preferred because when the container shown at 11 in FIG. 2 is oriented the reverse (upside down) of that shown in FIG. 2, droplets of water forming on the outside surface of the polyethylene container, tend to flow by gravity towards the open mouth portion of the container. Such droplets have a tendency to adhere to the polyethylene material and migrate back—in an upward direction due to capillary action—into the inner cavity of this polyethylene container. This tendency is broken if there is a lip protruding like configuration at that part of the polyethylene container where water droplets could fall by gravity away from container 2.

Shown in FIG. 1 is container 3 with an open top configuration 14 similar to that cavity shown at 6. At first glance, this cavity may be just a mere manner of design and choice; however, upon further reflection it can be seen that a connection in the electrical sense within an electronic circuit disposed in cavity 4 can be achieved at this end or portion of the apparatus by merely duplicating that portion of the apparatus shown in its upper extremities. However, such would be a mere duplication of parts, i.e. adding an additional terminal connector and an opening in plastic container 2. Therefore, such would be obvious to one of only ordinary skill in the art once possessing the information taught by this invention.

Shown in FIG. 2 is the apparatus case disposed in the soil 10 with the plastic filled portion of the plastic container 2 pointing in an upward direction. The apparatus case 11 can be disposed in the soil in the manner shown in FIG. 2, or it can be the reverse thereof, i.e. upside down from the orientation in FIG. 2. The greatest advantage of the lip-like portion, used to expedite the shedding of water droplets, can be achieved when the apparatus case 11 is affixed to a telephone pole or buried in the soil in the position that would have cavity 14 in the uppermost reaches of this position.

There is shown in FIG. 3a, 3b, 3c, and 3d, in schematic form, the sequential steps used to make the apparatus case shown in FIG. 1. At 12 in FIG. 3a, there is shown an open top plastic container which has been crosslinked either by irradiating the plastic mass or by using a catalyst plus heat. In this particular embodiment, the shape shown at 12 in FIG. 3a is that shape which is the ultimate desired configuration for the covering 2 shown in FIG. 1. Plastic case 12 is then biaxially oriented to create an elastic memory in the plastic material. This biaxial orientation can be achieved by pneumatic blowing the configuration 12 into the shape shown in 13 (FIG. 3b) as commonly done in the bottle blowing art. By introducing pneumatic pressure in the interior of the container 12 while said container is in a deformable state, biaxial orientation is achieved by blowing the plastic material against mold walls similar to that shape shown in FIG. 3b by element 13. Element 13 (FIG. 3b) at this stage of the process is a cross-linked plastic material that has an elastic memory. The next step in the process is to dispose the metallic member 3 on the inside of plastic container 13. This step is shown in FIG. 3c. As it has been previously mentioned, cavity 4 is a cavity which houses the electronic components which are connected to connector terminal 5, which itself has been fixedly attached to that upper closure member that forms part of cavity 4. Note that this connector terminal is adjacent to the open mouth portion of plastic container 13. Element 14 is a heater means and heat from this heater is then directed onto plastic container 13. The elastic memory of plastic container 13 then causes the plastic to shrink into the configuration shown in FIG. 3a. This shape or configuration is essentially the same as element 2 in FIG. 1 or 12 in FIG. 3a. Results of this step are shown in FIG. 3d, the parts of the apparatus case being in the same combination and position as that shown in FIG. 1 except for the disposition of cable 8, polyethylene grease 6, and the polyurethane foam 7. Usually but not always, the polyethylene grease is applied to the terminal connector soon after it has been connected to the electrical terminal conductors and subsequent to this step the polyurethane foam is disposed through the open top 9 and into plastic container 2 so as to seal up the cavity and enclose the components inside the plastic container 2. For some reason it may be that the polyurethane foam is of such a mass or quantity so as to completely fill the cavity of plastic container 2 not occupied by the electrical conductors, terminal connector, polyethylene grease, and metal container. However, as it has been previously explained, a lip-like portion formed by a partial filling is desired at the terminal portion of the open mouth of the plastic container 2.

When the apparatus case is in service, it is obviously exposed to and consequently attacked by elements of the weather and animals as well as man himself. Incident to such attack are extremes of temperature. Thus, there can be a continual expansion and contraction of the container contributing toward the formation of macroscopic and microscopic cracks in and at the polurethane crosslinked plastic interfaces. Even if such microscopic cracks do develop, and water vapor penetrates into the interior of the plastic container, the polyethylene grease will prohibit this water vapor from coming into contact with the electrical connection made at the terminal connector. The polyurethane preferably is a foam polyurethane and contains particulate material such as channel and carbon black (of micron and submicron size) in an inclusive range of 0–4%. This percentile is the same as that used for the filler material in crosslinked plastic 2 and the purpose that this filler material accomplishes is well known, i.e. resisting the ultraviolet light of the sun rays so as to deter any deterioration of the plastic.

However since it is known that carbon material in polyethylene and polyurethane affects the electrical characteristics of these materials, the percentage that this carbon black can be used is limited to the inclusive range of 0–4%. It is a further embodiment of this invention to dispose along with the carbon particulate material a rodent (gopher) repellent material. Such compound is well known and is sold on the commercial market as a gopher repellent agent. The particular polyethylene used for polyethylene container 2 can be either a low, intermediate or high density polyethylene as determined by ASTM designation: D1248–65T. That is to say, the density of this polyethylene can range from 0.910 up to 0.965 gram/cubic centimeter. This polyethylene may have a melt index that is greater than 25 and no lower than 0.3. However, the polyethylene used for container 2 is to be distinguished radically from that polyethylene grease-like material used to fill cavity 6. This grease-like material when subjected to extremes of cold temperatures will freeze to the point of where it may act like a true solid. However, upon returning to more moderate temperatures this polyethylene grease-like material will tend to act like an ordinary grease. Even when the polyethylene grease has been frozen to a solid-like material, it does not tend or have an in-service propensity to remain in such a solid state when more moderate temperatures are reached. However, asphaltic compounds, when used for the same purpose as the polyethyelne grease material, tend to permanently harden in service and as a consequence of this hardening, this material flakes and tends to act like a particulate material rather than a grease-like material when moderate temperatures are again encountered. Thus, it can be readily seen that the polyethylene grease-like material, even though it may be frozen to a state where it acts like a true solid, it will eventually return to its original state so as to perform its insulating purposes of keeping water and water vapor away from any electrical connection. Dow Chemical Corporation, underneath the designation of QX 4213.3, sells this polyethylene grease and has tested it using similar apparatus and method as described in ASTM D1238–65T. This ASTM Designation test method was modified to the extent that a temperature of 100° C. was used on the barrel of the extruder rather than a 125° C. Using the modified process, a melt index of 10–20 was measured with an orifice dimension of 0.020″.

Set forth below is a table of physical properties of the polyethlylene grease.

TABLE 1

| Property | Conditions | Value |
|---|---|---|
| Power factor | 1–100 kc | Less than $5 \times 10^{-5}$ |
| Dielectric constant | 1–100 kc | 2.15 |
| Mean specific heat | −40° to 100° C. | 0.53 calories/° C./gm. |
| Coefficient of volume expansion. | 25° C | $7.03 \times 10^{-4}$ |
| Density | 25° C | 0.851 gm./ml. |
| Water absorption percentage | 24 hours at 100% relative humidity. | Less than 0.01% |
| Pour point | | Approx. −10° C. |

Prior investigators have approached the problem of corrosion of buried apparatus cases in several different ways. One of these approaches is to encapsulate electronic components within various plastic materials such as epoxy resins and the like; however, it has been observed as result of changes in temperature, i.e. freezing and thawing, that the epoxy tends to shrink away and crack along the inner face between the epoxy resins and any material that forms an outer casing. It is these cracks, microscopic or macroscopic in nature, that allow water or water vapor to penetrate and reach any electronic components supposively protected by the epoxy. In the instant invention, contrary to that approached by prior investigators, not only is there an outer plastic mass of polyurethane foam that resists macroiscopic and microscopic cracks in itself but also between it and the outer crosslinked plastic sheets 2. Also there is always disposed in combination with this polyurethane foam the polyethylene grease. This polyethylene grease barrier acts in tandem with the polyurethane encapsulation and adds an additional barrier through which the water vapor must penetrate before it reaches any electrical connections.

The outer plastic covering 2 is a thermo-hardened (crosslinked) plastic material. Prior investigators have used thermoplastic materials as outer coverings on apparatus cases and it is quite obvious that these cases suffer from the deficiency that upon exposure to heat, the thermoplastic materials can and is reached to its thermoplastic state. This is contrary to the instant invention where a crosslinked material is used as the outer covering. In fact by definition there is no thermoplastic state of a crosslinked plastic. Thus, instead of the outer plastic container softening upon the application of heat, it is in fact flame retarding and resists any application of heat because of its crosslinked nature. Hence, it can be seen that plastic covering 2 retains its shape and is not subject to plastic deformation like a true thermoplastic sheath would be subject to when enough heat was applied to soften the material.

In summary it can be seen that the instant invention is directed towards encapsulating electronic components so they can be protected from corrosion while they are buried in the ground; however, the same apparatus can be exposed above ground with equal facility. Almost absolute prohibition of electrolysis effects and weathering attacks can be achieved through this invention, such being accomplished by using a thermo-hardenable (crosslinked) plastic in combination with a polyurethane and a polyethylene grease-like material. The crosslinked material is extraordinarily tough and is not normally affected by extremes of temperatures, whereas true thermoplastic materials would soften and run when exposed to extreme heat. The prior art has shown that the use of epoxy resins to encapsulate electronic components is known. However, as it has been set forth previously, the use of such epoxy resins eventually encounter the formation of macroscopic or microscopic cracks, these cracks forming in the epoxy resin through the expansion and contraction of the epoxy resins as it is exposed to temperature extremes. In the instant invention, even if macroscopic or microscopic cracks are created in the polyurethane, which is highly unlikely, the polyethylene grease disposed about the electrical connection still keeps moisture and water vapor away from any of the electrical connects.

From the foregoing, it is believed that the invention may be readily understood by those skilled in the art without further description, it being borne in mind that numerous changes may be made in the details disclosed without departing from the spirit of the invention as set forth in the following claims.

I claim:

1. An article of manufacture containing electrical components adapted to withstand corrosive attack comprising in combination:
   (a) a first container comprising at least one enclosed internal cavity in which an electrical circuit is disposed, the circuit being in electrical connection with a connector terminal placed on an outside portion of said first container;
   (b) a second container made of a crosslinked plastic having an open mouth and a volume greater than said first container, the second container being engagingly disposed on the outside of the first container connection of the first container being adjacent to the open;
   (c) a first mass of organic material surrounding the terminal connector;
   (d) a second mass of organic material of a different composition, at least partially filling that volume of said second container not occupied by said first mass of organic material, terminal connector and first container.

2. An article of manufacture as described in claim 1, wherein the crosslinked plastic is a polyolefin containing particulate filler material.

3. An article of manufacture as described in claim 1, wherein the first mass of organic material is an amorphous grease-like polyethylene material having an average molecular weight below about 10,000 and a density at 25° C. of about 0.851 gram/millimeter.

4. An article of manufacture as described in claim 1, wherein the second mass of organic material is a polyurethane containing a particulate filler.

5. An article of manufacture as described in claim 1, wherein the first container is composed of metal, the second container is a crosslinked plastic containing a particulate filler, and the second mass of plastic is a foam polyurethane containing a particulate filler.

6. An article of manufacture containing electronic components adapted to withstand corrosive attack comprising in combination:
   (a) a metal container having at least one side wall and one closure means affixed to said side wall, said closure means being recessed inwardly from at least one of the side wall's terminal portions, thereby forming internal and external cavities, said external cavity having an open mouth formed by said side wall;
   (b) a crosslinked plastic container having an open mouth and a volume greater than the metal container engagingly disposed on the outside surface of said metal side wall, that volume of the plastic container not occupied by the metal container being adjacent the open mouth formed by said metallic sidewall;
   (c) an electronic circuit fixedly attached inside said internal cavity and in electrical connection with a connector terminal fixedly attached to at least one side wall forming a portion of an external cavity, said connector terminal being disposed adjacent to the open mouth of the plastic container;
   (d) an elongated electrical conductor in electrical connection with said connector terminal;
   (e) a mass of amorphous polyethylene grease-like material having an average molecular weight of about 10,000 and a density of 25° C. of about 0.851 gram/millimeter encapsulating the electrical connection between the connector terminal and the electrical conductor;
   (f) a mass of polyurethane plastic disposed over said polyethylene grease and at least partially filling that volume of the plastic container not occupied by the metal container, electrical conductor, terminal connector, and grease.

7. An article of manufacture as described in claim 6, wherein the crosslinked and urethane plastic contain a particular filler material.

8. An article of manufacture as described in claim 6, wherein the urethane material is a foamed plastic.

9. An article of manufacture as described in claim 6, wherein the polyurethane of item (f) incompletely fills the volume not occupied by the metal container, electrical conductor, grease and connector terminal, so as to leave a protruding lip of crosslinked plastic at the terminal portion of the plastic container's open mouth.

10. A method of making an electrical unit adapted to withstand corrosive attack, the steps comprising:
   (a) providing an open top plastic first container possessing an elastic memory, that upon heat shrinking same a volume is achieved that is greater than that occupied by a second enclosed container;
   (b) providing a second enclosed container having an electronic circuit disposed therein, said circuit being in electrical connection with a terminal connector attached to the outside surface of said second container;
   (c) placing said second container inside said first plastic container so that the terminal connector is adjacent to the open top of the first plastic container and heat shrinking said plastic container to a predetermined shape;
   (d) making a connection adapted to carry electrical current between an electrical conductor and said terminal connector;
   (e) encasing the thus made connection with an organic grease-like material;
   (f) at least partially filling that volume of the plastic container not occupied by the grease, terminal connector, electrical conductor and the second container with a different organic material.

11. A method of making an encapsulated article as defined in claim 10, wherein the grease-like material of step (e) is an amorphous grease-like polyethylene material, having an average molecular weight below about 10,000 and a density at 25° C. of about 0.851 gm./ml.

12. A method of making an encapsulated article as defined in claim 10, wherein the organic plastic of step (f) is a polyurethane plastic.

13. A method of making an encapsulated article as defined in claim 10, wherein the plastic of step (a) is crosslinked prior to it being heat shrunk, and is filled with a particulate material within the inclusive weight range of 0–4%.

14. A method of making an encapsulated article as defined in claim 12, wherein the urethane plastic is a foam plastic and contains a particulate filler falling within the inclusive weight range of 0–4%.

15. An article of manufacture containing electric components comprising an open top first container made of a crosslinked plastic disposed around a second container having a volume significantly less than said first container, that volume of said first container not otherwise occupied by said second container being essentially filled with plastic material.

16. An article as defined in claim 15 wherein said second container is made of metal.

17. An article of manufacture as defined in claim 15 wherein said plastic material filling said volume is made up of two plastic materials having different compositions.

18. An article as defined in claim 17 wherein said plastic materials are a polyethylene and polyurethane.

19. An article of manufacture as defined in claim 18 wherein said polyethylene is an amorphous grease-like polyethylene material having an average molecular weight below about 10,000 and a density of 25° C. of about 0.851 gram/millimeter.

20. An article of manufacture as defined in claim 18 wherein said polyurethane contains a particular filler.

21. An article of manufacture as described in claim 15 wherein insulated electrical conductors nested inside of a cable sheath are in electrical connection with a connector terminal fixedly attached to an outside portion of said second container.

22. An article as defined in claim 18 wherein said polyethylene absorbs less than 0.01 percent water when exposed for 24 hours at 100 percent relative humidity.

23. An article of manufacture as described in claim 18 wherein said polyethylene is in contact with and next adjacent to said second container and said polyurethane lies on top of and in contact with both the polyethylene and said open top first container.

References Cited

UNITED STATES PATENTS

| 2,136,609 | 11/1938 | Butterfield et al. | 336—96 X |
| 2,886,626 | 5/1959 | Burnett et al. | |

FOREIGN PATENTS 268,328   1/1964   Australia.

ELLIOT A. GOLDBERG, Primary Examiner

D. A. TONE, Assistant Examiner

U.S. Cl. X.R.

264—272